US011375021B2

(12) United States Patent
Bhaumik et al.

(10) Patent No.: US 11,375,021 B2
(45) Date of Patent: Jun. 28, 2022

(54) EDGE BASED SENSOR ACTUATION AND CONTROL IN IOT NETWORK FOR EVENT MONITORING

(71) Applicant: Tata Consultancy Services Limited, Mumbai (IN)

(72) Inventors: Chirabrata Bhaumik, Kolkata (IN); Rajat Das, Kolkata (IN); Arpan Pal, Kolkata (IN); Tapas Chakravarty, Kolkata (IN); Raj Rakshit, Kolkata (IN); Avik Ghose, Kolkata (IN); Amit Swain, Kolkata (IN); Arijit Sinharay, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/136,436

(22) Filed: Dec. 29, 2020

(65) Prior Publication Data
US 2021/0243260 A1 Aug. 5, 2021

(30) Foreign Application Priority Data

Feb. 21, 2020 (IN) .............................. 202021007498

(51) Int. Cl.
*H04L 12/00* (2006.01)
*H04L 67/125* (2022.01)
(Continued)

(52) U.S. Cl.
CPC .......... *H04L 67/125* (2013.01); *G06F 16/258* (2019.01); *G16Y 30/00* (2020.01); *G16Y 40/10* (2020.01)

(58) Field of Classification Search
CPC ....... H04L 67/125; H04W 4/38; G16Y 40/10; G16Y 30/00; G06F 16/258; G01S 13/86
(Continued)

(56) References Cited

U.S. PATENT DOCUMENTS 10,007,513 B2 6/2018 Malladi et al.
2017/0257341 A1* 9/2017 Arsenault ........... H04L 61/6004
(Continued)

FOREIGN PATENT DOCUMENTS

EP 3433711 A1 11/2019

OTHER PUBLICATIONS

Author: Gabriel Mujica, Roberto Rodriguez-Zurrunero, Mark Richard Wilby, Jorge Portilla, Ana Belén Rodríguez González, Alvaro Araujo, Teresa Riesgo, and Juan José Vinagre Díaz Title: Edge and Fog Computing Platform for Data Fusion of Complex Heterogeneous Sensors Title of the item: Journals Sensors Date: 2018 vol. 18, issue 11 Publisher: MDPI Link: https://www.mdpi.com/1424-8220/18/11/3630.
(Continued)

*Primary Examiner* — Frantz Coby
(74) *Attorney, Agent, or Firm* — Finnegan, Henderson, Farabow, Garrett & Dunner, LLP

(57) ABSTRACT

Any sensing system is faced with triangle of dilemma between accuracy, latency and energy. High energy and high latency sensing systems are often very accurate but less useful. Embodiments herein provide a method and system for edge based sensor controlling in the IoT network for event monitoring. The system disclosed herein applies a hierarchical sensor selection process and adaptively chooses sensors among multiple sensors deployed in the IoT network. Further, on-the-fly changes operation modes of the sensors to automatically produce the best possible inference from the selected sensor data, in time, power and latency at the edge. Further, sensors of the system include a waveform and diversity control mechanism that enables controlling of an excitation signal of the sensor.

9 Claims, 7 Drawing Sheets

(51) Int. Cl.
*G06F 16/25* (2019.01)
*G16Y 30/00* (2020.01)
*G16Y 40/10* (2020.01)

(58) Field of Classification Search
USPC .................................................. 709/220, 217
See application file for complete search history.

(56) References Cited

U.S. PATENT DOCUMENTS

| 2018/0062919 | A1* | 3/2018 | Justin .................. H04L 43/0864 |
| 2019/0129410 | A1 | 5/2019 | Cella et al. |
| 2019/0173971 | A1* | 6/2019 | Na ........................ H04L 43/028 |
| 2019/0200187 | A1* | 6/2019 | Na .......................... H04L 67/12 |

OTHER PUBLICATIONS

Author: Klemen Kenda, Blaž Kažič, Erik Novak, and Dunja Mladenić Title: Streaming Data Fusion for the Internet of Things Title of the item: Computer Science, Medicine-Sensors Date: 2019 Publisher: Semantic Scholar Link: https://pdfs.semanticscholar.org/2a0c/2be79ecfe00923220ee770a696a61082a879.pdf?_ga=2.241813122.1805857082.1608615487-1200652183.1608615487.

Author: Yi Liu, Chao Yang, Li Jiang, Shengli Xie, and Yan Zhang Title: Intelligent Edge Computing for IoT-Based Energy Management in Smart Cities Title of the item: IEEE Network Date: 2019 vol. 33, Issue: 2 pp. 111-117 Publisher: IEEE Link: https://www.researchgate.net/publication/331951759_Intelligent_Edge_Computing_for_IoT-Based_Energy_Management_in_Smart_Cities/link/5c9498d392851cf0ae8ed255/download.

Author: Jiheon Kang and Doo-Seop Eom Title: Offloading and Transmission Strategies for IoT Edge Devices and Networks Title of the item: Journals Sensors Date: 2019 Publisher: MDPI Link: https://www.mdpi.com/1424-8220/19/4/835/pdf.

Author: Masayuki Hirayama Title: Sensor Selection method for IoT systems—focusing on embedded system requirements Title of the item: Matec Web of Conferences Date: Jan. 2016 Publisher: Research Gate Link: https://www.researchgate.net/publication/303506032_Sensor_Selection_method_for_IoT_systems_-_focusing_on_embedded_system_requirements/link/5745b86308ae9ace842418fa/download.

* cited by examiner

EDGE BASED SENSOR ACTUATION AND CONTROL IN IOT NETWORK FOR EVENT MONITORING

PRIORITY CLAIM

This U.S. patent application claims priority under 35 U.S.C. § 119 to the Indian patent application no. 202021007498, filed on Feb. 21, 2020. The entire contents of the aforementioned application are incorporated herein by reference.

TECHNICAL FIELD

The embodiments herein generally relate to the field of edge based computing and, more particularly, to method and system for providing edge based sensor actuation and control in an Internet of Things (IoT) network for event monitoring.

BACKGROUND

Unobtrusive sensing enables step-wise understanding of a real-world physical process. Remotely monitoring and controlling of the real world physical processes is achieved through Cyber-physical systems or Internet of Things (IoT) network. However, such systems are often constrained by computing power, memory, bandwidth and power usage for long term monitoring. Sensors deployed in the IoT network are heterogeneous sensors with combination of passive and active sensors. Conventionally, for continuous monitoring of an event of interest all sensors need to be operational 24×7 with full power mode. For example, monitoring an Activity of Daily Living (ADL) type IoT application the unobtrusive sensing utilizes radars, which consume large amount of power when operating in full power mode. Further, active sensors may provide multiple modes of operation, which are selectively applicable for various stages in the event monitored. Conventional method do not address the technical problem of controlling of these sensors on the fly, in accordance with real time event been detected during monitoring. Further, these controlling need to be in real time and controlling from cloud is not desirable. Thus, edge based decision making is crucial because sensors and computational illumination techniques for active sensors have to be chosen not only fast in time but also need to use least power and accumulate least uncertainty in the process, with optimal resolution of data been collected to provide highest possible accuracy in event detection.

An existing approach provides adaptive scheduling of a multiplexer for data collection from a heterogeneous sensor system, however system limits sensor selection to only data collection aspect and does not address controlling and actuation of sensors.

SUMMARY

Embodiments of the present disclosure present technological improvements as solutions to one or more of the above-mentioned technical problems recognized by the inventors in conventional systems. For example, in one embodiment, a method enabling edge based sensor actuation and control in Internet of Things (IoT) network for event monitoring is provided.

The method comprises selecting an initial set of sensors among a plurality of sensors deployed in the IoT network to monitor a Region of Interest (ROI) and provide sensor data for an IoT application, wherein the initial set of sensors comprise a combination of active sensors and passive sensors, and wherein the active sensors are selected in accordance with a range criteria and preset power constraint for the IoT application.

The method further comprises activating the initial set of sensors, wherein one or more parameters associated with each of the active sensors are activated in a first mode of operation and each of the active sensors are set to a first set of parameter values when activated in the first mode of operation for detecting a basic event in the ROI.

The method further comprises receiving sensor data from the initial set of sensors and preprocessing the sensor data by: applying time stamps on the sensor data received from each of the initial set of sensors for time synchronizing the sensor data; and reducing dimensions of the time stamped sensor data using dimension reduction technique to obtain a reduced dimension sensor data.

The method further comprises fusing the reduced dimension sensor data associated with each of the initial set of sensors in accordance with a chronological order of the time stamps to generate a plurality of fused datasets from the reduced dimension sensor data, wherein each fused dataset from the plurality of fused datasets represents a virtual sensor comprising combination of sensor data from each of the initial set of sensors, wherein data associated with the virtual sensor has matching time stamps.

The method further comprises detecting the basic event by processing the plurality of fused datasets and activating, on detection of the basic event, the active sensors and one or more additional active sensors from the plurality of sensors to a second mode of operation to seamlessly track the basic event, wherein the one or more parameters associated with each of the active sensors and the one or more additional sensors are set to a second set of parameter values when activated in the second mode of operation.

Furthermore, the method comprises generating and sending a request code generated to the active sensors and the one or more additional active sensors to change an excitation signal of the active sensors and the one or more additional active sensors in accordance to a main event of interest to be monitored, wherein the main event is associated with the tracked basic event.

Furthermore, the method comprises receiving the sensor data at higher resolution from the active sensors and the one or more additional active sensors operating in the second mode of operation.

Furthermore, the method comprises repeating the steps of pre-processing, fusing and processing the sensor data received from the active sensors and the one or more additional active sensors operating in the second mode of operation to detect and track the main event of interest.

In another aspect, a system enabling edge based sensor actuation and control in Internet of Things (IoT) network for event monitoring is provided. The system comprises a memory storing instructions; one or more Input/Output (I/O) interfaces; and one or more hardware processors coupled to the memory via the one or more I/O interfaces, wherein the one or more hardware processors are configured by the instructions to select an initial set of sensors among a plurality of sensors deployed in the IoT network to monitor a Region of Interest (ROI) and provide sensor data for an IoT application, wherein the initial set of sensors comprise a combination of active sensors and passive sensors, and wherein the active sensors are selected in accordance with a range criteria and preset power constraint for the IoT application.

Further, the one or more hardware processors are configured to activate the initial set of sensors, wherein one or more parameters associated with each of the active sensors are activated in a first mode of operation and each of the active sensors are set to a first set of parameter values when activated in the first mode of operation for detecting a basic event in the ROI.

Further, the one or more hardware processors are configured to receive sensor data from the initial set of sensors and preprocess the sensor data by: applying time stamps on the sensor data received from each of the initial set of sensors for time synchronizing the sensor data; and reducing dimensions of the time stamped sensor data using dimension reduction technique to obtain a reduced dimension sensor data.

Further, the one or more hardware processors are configured to fuse the reduced dimension sensor data associated with each of the initial set of sensors in accordance with a chronological order of the time stamps to generate a plurality of fused datasets from the reduced dimension sensor data, wherein each fused dataset from the plurality of fused datasets represents a virtual sensor comprising combination of sensor data from each of the initial set of sensors, wherein data associated with the virtual sensor has matching time stamps. Furthermore, the one or more hardware processors are configured to detect the basic event by processing the plurality of fused datasets and activate, on detection of the basic event, the active sensors and one or more additional active sensors from the plurality of sensors to a second mode of operation to seamlessly track the basic event, wherein the one or more parameters associated with each of the active sensors and the one or more additional sensors are set to a second set of parameter values when activated in the second mode of operation.

Furthermore, the one or more hardware processors are configured to generate and send a request code generated to the active sensors and the one or more additional active sensors to change an excitation signal of the active sensors and the one or more additional active sensors in accordance to a main event of interest to be monitored, wherein the main event is associated with the tracked basic event.'

Further, the one or more hardware processors are configured to receive the sensor data at higher resolution from the active sensors and one or more additional active sensors operating in the second mode of operation; and repeat the step of pre-processing, fusing and processing the sensor data received from the active sensors and the one or more additional active sensors operating in the second mode of operation to detect and track the main event of interest.

In yet another aspect, there are provided one or more non-transitory machine readable information storage mediums comprising one or more instructions, which when executed by one or more hardware processors causes a method for enabling edge based sensor actuation and control in Internet of Things (IoT) network for event monitoring.

The method comprises selecting an initial set of sensors among a plurality of sensors deployed in the IoT network to monitor a Region of Interest (ROI) and provide sensor data for an IoT application, wherein the initial set of sensors comprise a combination of active sensors and passive sensors, and wherein the active sensors are selected in accordance with a range criteria and preset power constraint for the IoT application.

The method further comprises activating the initial set of sensors, wherein one or more parameters associated with each of the active sensors are activated in a first mode of operation and each of the active sensors are set to a first set of parameter values when activated in the first mode of operation for detecting a basic event in the ROI.

The method further comprises receiving sensor data from the initial set of sensors and preprocessing the sensor data by: applying time stamps on the sensor data received from each of the initial set of sensors for time synchronizing the sensor data; and reducing dimensions of the time stamped sensor data using dimension reduction technique to obtain a reduced dimension sensor data.

The method further comprises fusing the reduced dimension sensor data associated with each of the initial set of sensors in accordance with a chronological order of the time stamps to generate a plurality of fused datasets from the reduced dimension sensor data, wherein each fused dataset from the plurality of fused datasets represents a virtual sensor comprising combination of sensor data from each of the initial set of sensors, wherein data associated with the virtual sensor has matching time stamps.

The method further comprises detecting the basic event by processing the plurality of fused datasets and activating, on detection of the basic event, the active sensors and one or more additional active sensors from the plurality of sensors to a second mode of operation to seamlessly track the basic event, wherein the one or more parameters associated with each of the active sensors and the one or more additional sensors are set to a second set of parameter values when activated in the second mode of operation.

Furthermore, the method comprises generating and sending a request code generated to the active sensors and the one or more additional active sensors to change an excitation signal of the active sensors and the one or more additional active sensors in accordance to a main event of interest to be monitored, wherein the main event is associated with the tracked basic event.

Furthermore, the method comprises receiving the sensor data at higher resolution from the active sensors and the one or more additional active sensors operating in the second mode of operation.

Furthermore, the method comprises repeating the steps of pre-processing, fusing and processing the sensor data received from the active sensors and the one or more additional active sensors operating in the second mode of operation to detect and track the main event of interest.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
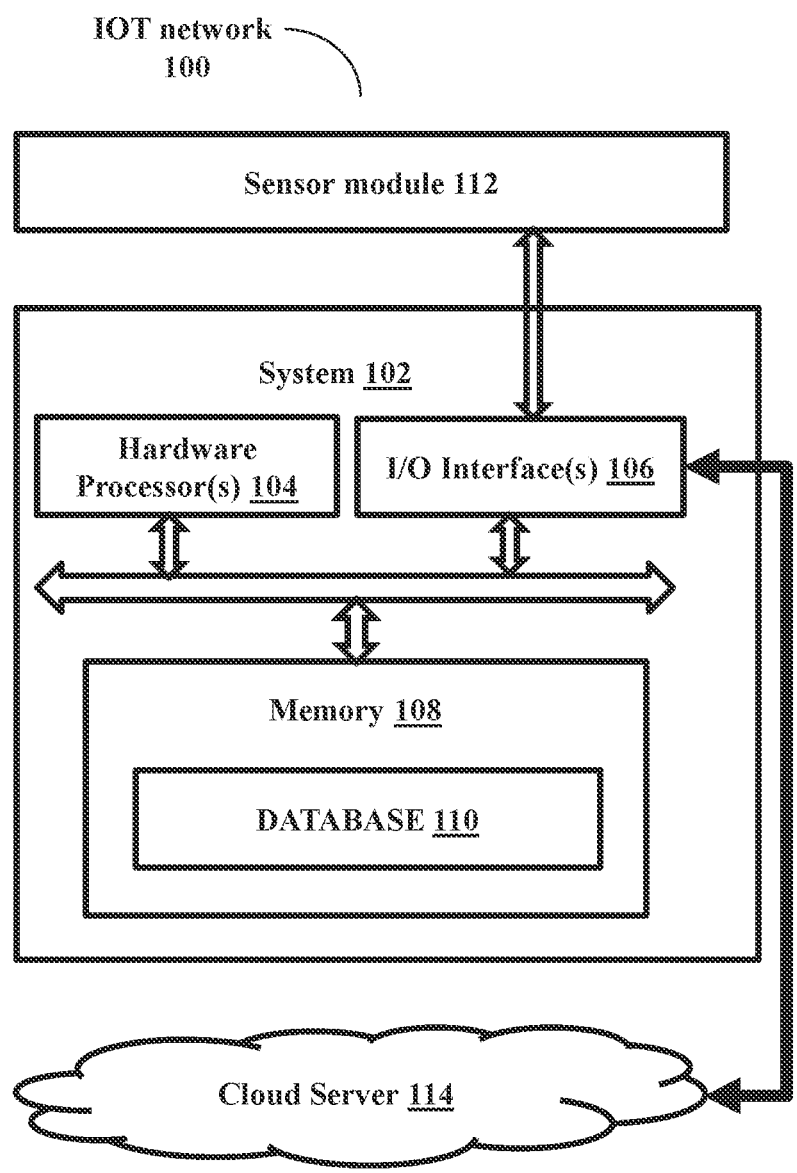
FIG. 1 illustrates a functional block diagram of a system for providing edge based sensor actuation and control in the IoT network for event monitoring, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As mentioned earlier edge based decision making becomes crucial because sensors and computational illumination techniques for active sensors have to be chosen not only fast in time but also using least power and accumulating least uncertainty in the process. Further, the sensors deployed in an Internet of Things (IoT) network are heterogeneous sensors and may be a combination of active and passive sensors. Thus, it is critical that right sensors are selected, and they operate in appropriate modes of operation so that balance between accuracy of sensor data and power consumption by the sensors is achieved. For example, industrial machines of in different fields such as oil and gas, mining, steel, power plants require a continuous health and process monitoring to minimize the down time. In current scenario, where event monitored is machine condition, different sensors like camera, current, microphone, ultrasound, radar, temperature sensor are placed in the periphery and by exploiting the cloud infrastructure different analytics are run on these sensor data to track any anomalous event. However, it is not practical to send all the data to cloud storage because of irregularity in network connectivity, network bandwidth is not enough and overall a real time corrective measure may not be feasible for taking any predictive maintenance of the machine or any corrective measure in the process flow. This may result in significant damage in the machine or down time in the process flow. This problem can be solved with processing the sensor data at edge systems. Further, considering the power constraints when operating the above sensors in continuous full power operation mode, it is required to have selective control over each sensor to manage activation of sensor along with mode of operation of the sensor to ensure the sensing system work in optimal power ode without losing the data accuracy of the event been monitored. Further, to achieve such control in real time it is required to perform the controlling at edge systems.

Unlike existing edge system, which are software controlling units, the edge framework disclosed herein provides a combination of software and hardware processing at the edge.

Embodiments herein provide a method and system for edge based sensor actuation and control in an Internet of Things (IoT) network for event monitoring. The system disclosed herein, may be alternatively referred as edge framework or edge device and is used interchangeably herein after. The system collects various types of data from varied types of sensors over varied types of physical connections using publish/subscribe two way communication protocol. All the sensor data is time-stamped, then processed and further fused at the edge framework to represent as a logical virtual single sensor for running light weight analysis on the collective sensor data at the edge system. Further, the data representing the virtual sensor can be then shared to cloud server for high end analytics, Any sensing system is faced with the triangle of dilemma between accuracy, latency and energy. High energy and high latency systems are often very accurate but found to be less useful. Hence, system disclosed herein applies a hierarchical sensor selection process. The system adaptively chooses and actuates sensors among multiple sensors deployed in the IoT network and further on-the-fly changes operation modes of the sensors to automatically produce the best possible inference from the selected sensor data, in time, power and latency at the edge. Further, sensors disclosed herein include a waveform and diversity control mechanism that are capable of changing an excitation signal of the sensor in accordance with request received from the edge via a subunit of the system 102.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates a functional block diagram of a system 102 for providing edge based sensor actuation and control in an IoT network 100 for event monitoring, in accordance with some embodiments of the present disclosure.

In an embodiment, the system 102 or the edge device enables edge based sensor actuation and controlling and edge based computing of sensor data in the IoT network 100. The system 102 includes a processor(s) 104, communication interface device(s), alternatively referred as input/output (I/O) interface(s) 106, and one or more data storage devices or a memory 108 operatively coupled to the processor(s) 104. The system 102 with one or more hardware processors is configured to execute functions of one or more functional blocks of the system 102. The system 102 further includes a sensor module 112 comprising a plurality of sensors providing a combination of active and passive sensors. One or more sensors from the plurality of sensors are selectively controlled by the system 102. The selective control includes a) activating only the selected sensors and further varying mode of sensors by remotely changing operating parameters of the plurality of sensors deployed in a Region of Interest (ROI) within the IoT network. Thus, system 102 provides basic continuous monitoring with minimal sensors operating at low power modes followed by an intensive monitoring short period monitoring to detect an activity of interest carried out in the ROI.

Referring to the components of the system 102, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 108. In an embodiment, the system 100 can be implemented in a variety of computing systems including laptop computers, notebooks, hand-held devices such as mobile phones, workstations and the Ike.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server. Further the I/O interface 106 provides interface for communicating with the sensor module 112 and a cloud server 114. The cloud server 114 performs high end data analytics on sensor data, wherein time stamped sensor data is provided by the system to the cloud server 114 as a virtual sensor comprising time synchronized sensor data.

The memory 108 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the memory 108 may include a database 110, which stores sensor data after time stamping, the fused sensor data representing the virtual sensor, sensor error models for each sensor, look up tables for excitation signals for the sensors and the like. In an embodiment, the database 110 may be external to the system 102 (not shown) and coupled to the system via the I/O interface 106. Further, the memory 108 may comprise information pertaining to input(s)/output(s) of each step performed by the processor(s) 104 of the system 102 and methods of the present disclosure. Functions of the components of system 102 are explained in conjunction with and example architectural overview of the system 102 described in FIG. 2, flow diagram of FIGS. 3A and 3B, through subunits of the system in FIGS. 4A and 4B and hardware associated with the sensor depicted in FIG. 5.

Figure 2:
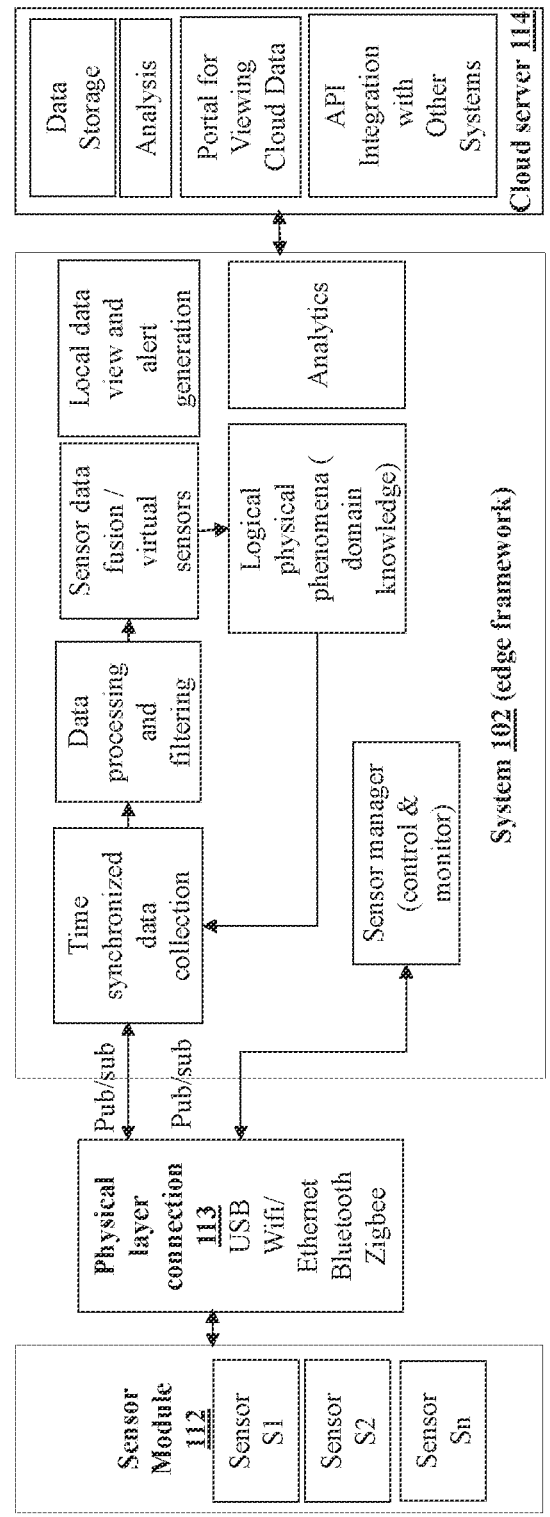
FIG. 2 illustrates an example architectural overview of the system of FIG. 1 implemented in the IoT network, in accordance with some embodiments of the present disclosure.

FIG. 2 illustrates an example architectural overview of the system 102 of FIG. 1 implemented in the IoT network, in accordance with some embodiments of the present disclosure. The sensor module 112 may consist of multiple identical sensors and/or diverse sensors connected via physical layer wired/wireless connection like USB, Wi-Fi/Ethernet, Bluetooth, Zigbee or the like with the edge framework or the system 102. The two way communication between the system 102 and sensor network is via publish/subscribe based protocol. Initially the sensors such as Sensor-S1, Sensor-S2 through Sensor-Sn can be triggered via the edge framework (system 102). A sensor manager within the edge framework can configure the sensor parameters via control signals and can also monitor each sensor. Once initialized, for a configurable time period the series of data from different sensors are acquired by the system 102 via publish/subscribe model, well known in the art. Sensor data collection is a recurring process for a predefined time period. Unlike conventional edge computing systems, the system 102 disclosed herein, is a mixture of hardware and software. Thus, along with initiation or activation of sensors, the system 102 can change the excitation waveform from the edge using the subunit of the system 102, described in conjunction with FIGS. 4A and 4B. The change in excitation signals enables changing sensor data behavior on the fly.

Figure 5:
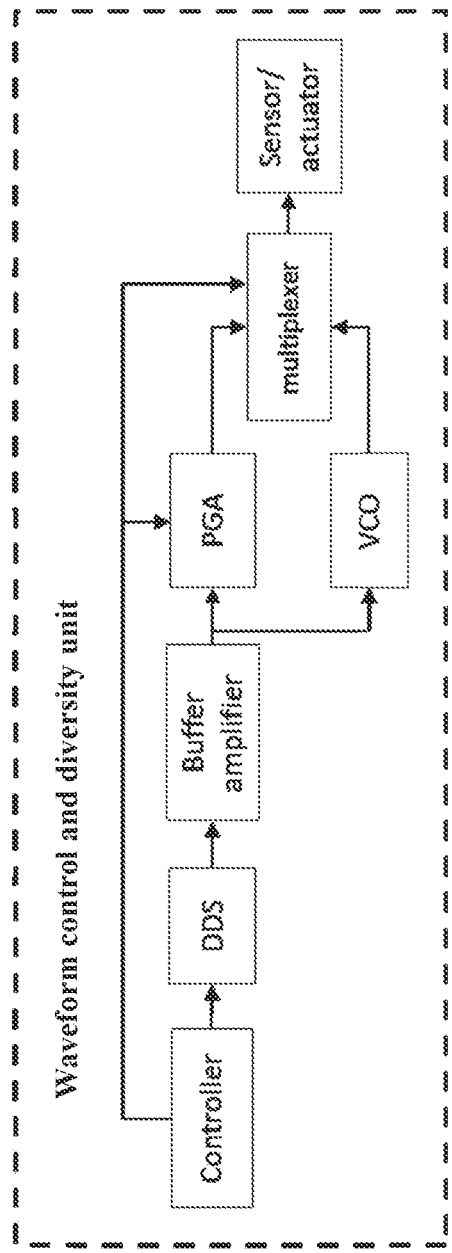
FIG. 5 illustrates a block diagram of a waveform and diversity control mechanism in a sensor to control excitation signal of the sensor through the subunit of the system depicted in FIGS. 4A and 4B, in accordance with some embodiments of the present disclosure.

Further, to enable sensors to operate in accordance with changes in the excitation signal communicated by the system 102, the sensors are equipped with a waveform control and diversity unit, as explained in conjunction with FIG. 5. The waveform control and diversity unit used a type of signal to generate trigger pulses, on-off signal and also to change the working or operational mode of a particular sensor. The waveform control can be executed by a known Direct Digital Synthesis (DDS) method by generating a time-varying signal in digital form and then performing a digital-to-analog conversion. This DDS output is further given to a voltage control oscillator (VCO) for generating the waveform.

Further, all sensor data acquired from the sensor module 112 is time synchronized so capture complete picture of a physical phenomenon been monitored. After time synchronization the dimensionality of large data sets is reduced by transforming a large set of variables into a smaller one that still contains most of the information in the large set. Sometimes, the information extracted from different sensor data is correlated, and hence redundant. This is where dimensionality reduction algorithms come into play. Dimensionality reduction is the process of reducing the number of random variables under consideration, by obtaining a set of principal variables. Simultaneously filtering can also be performed on the sensor data. Filtering removes noise or unwanted components or features from signal received from the sensor, which improves accuracy of inference derived from the processed sensor data.

Further, the reduced dimension data sets comprising data from different sensors are fused together in a chronological order providing a virtual sensor. Thereafter, based on the IoT application and the activity of interest to be detected various known signal processing techniques can be used to analyze the fused data set to derive inference detect the abnormal event or abnormality in the activity been monitored, such as abnormal machine condition. For example, of machine monitoring mentioned herein, the range of frequency at which the machine is rotating is known. During monitoring the machine vibration data can be converted to the frequency domain using Fourier transform, or wavelet transform to see any abnormality. However, if a limited result inferred from the sensor data captured over a predefined time period does not give rise to any conclusion, say on abnormality of machine condition, the particular result is kept in an ordered queue. A similar process for deriving inference is repeated for a configurable number (counter) of consecutive datasets and the results are maintained in the queue. Next by checking the overall picture of the queue a logical conclusion can be drawn hether alert needs to be generated or not. Considering an example here, say in a long conveyor belt coal is moving from one end to the other end of the plant. The task is to detect if there is any particle other than coal in the belt. Here if just a single camera snap is analyzed, there may be many false positives instances. Here as per the time stamp, a buffer or a ordered queue is maintained by the system 102 comprising multiple snaps taken over a time period. Further, all the snaps in the queue are analyzed to derive a logical decision on presence of unwanted particle. This approach will reduce false alarms. After the counter limit exceeds the queue is released and this flow continues for next incoming sensor data as depicted in FIG. 2. This fused sensor data (fused datasets) can be further fetched to cloud server 114 for storage and further high end data analytics.

Figure 3A:
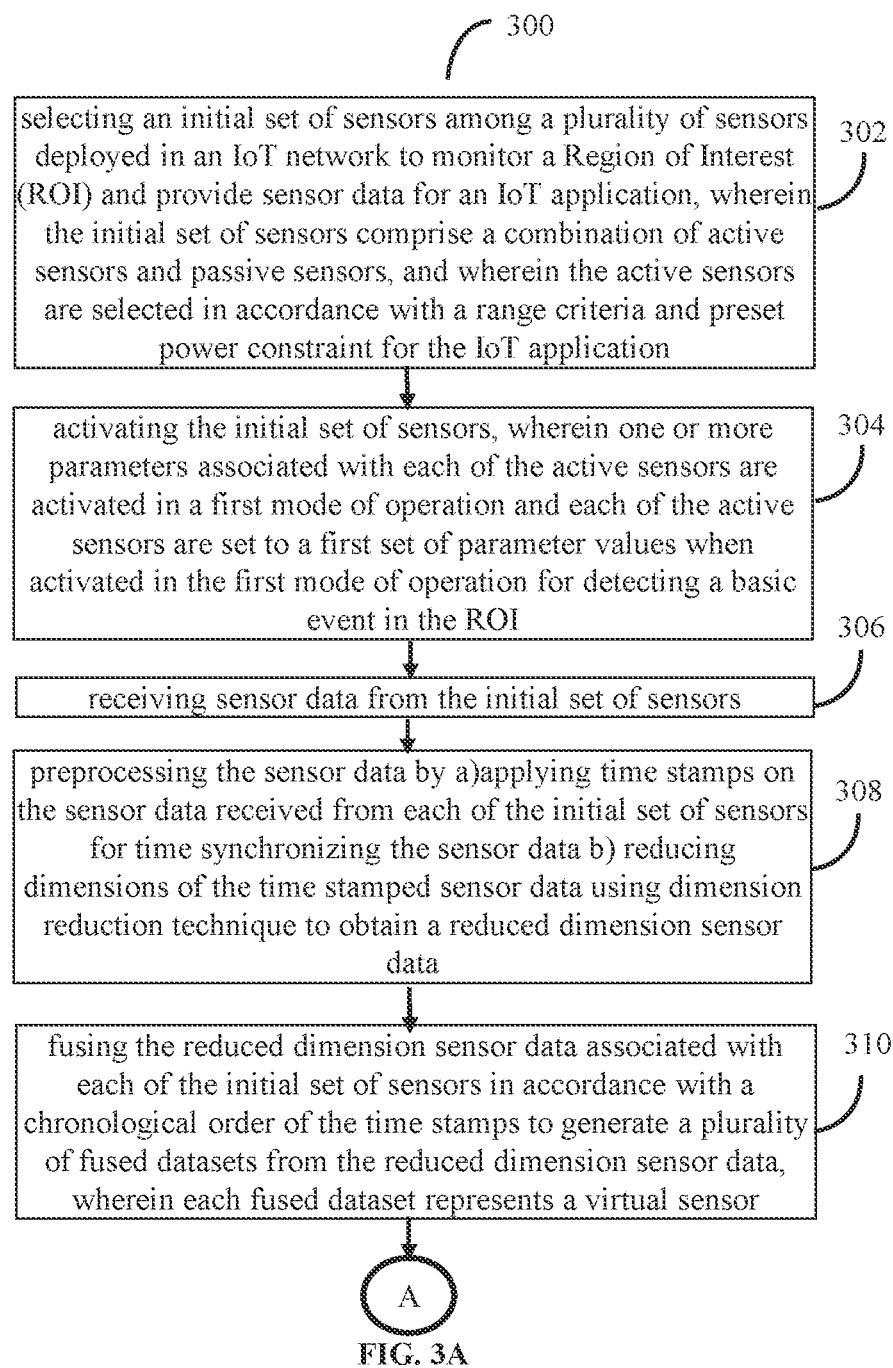
FIG. 3A and FIG. 3B are a flow diagram illustrating a method for providing edge based sensor actuation and control in the IoT network for event monitoring, using the system of FIG. 1, in accordance with some embodiments of the present disclosure.
Figure 3B:
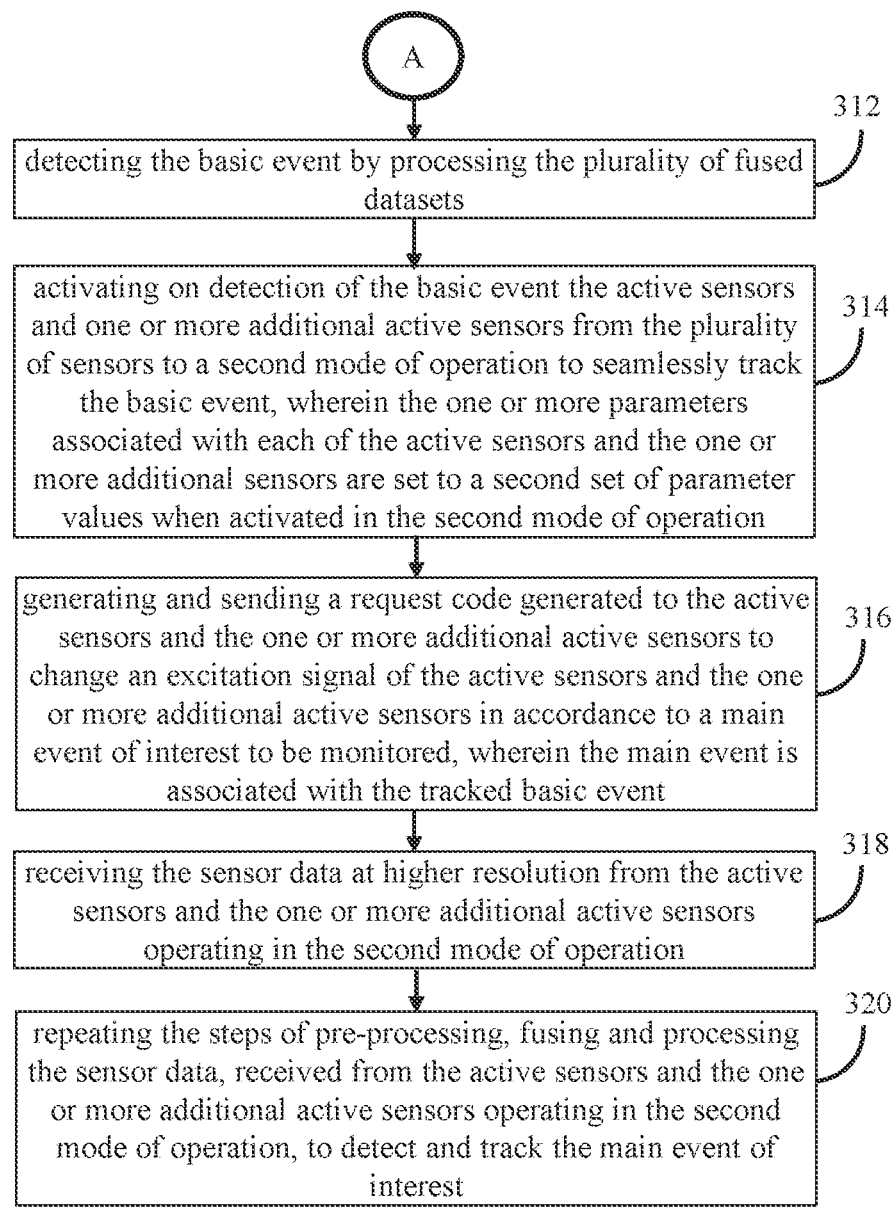

FIG. 3A and FIG. 3B are a flow diagram illustrating a method for providing edge based sensor actuation and control in the IoT network 100 for event monitoring, using the system 102 of FIG. 1, in accordance with some embodiments of the present disclosure. In an embodiment, the system 102 comprises one or more data storage devices or the memory 108 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 102 as depicted in FIG. 1, architectural overview of the system as depicted in FIG. 2, the steps of flow diagram as depicted in FIG. 3A through FIG. 3B, the subunit comprising a processing unit (PU) and an actuation unit (AU) corresponding to each sensor of the system 102 depicted in FIGS. 4A and 4B, and the waveform control and diversity unit at each sensor end depicted in FIG. 5. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 300, at step 302, the one or more hardware processors 104 are configured to select an initial set of sensors among a plurality of sensors deployed in the IoT network to monitor the ROI and provide sensor data for an IoT application. The initial set of sensors comprises a combination of active sensors and passive sensors. The selection of the active sensors is in accordance with a range criteria and preset power constraint for the IoT application. At step 304 of the method 300, the one or more hardware processors 104 are configured to activate the initial set of sensors. One or more parameters associated with each of the active sensors are activated in a first mode of operation and each of the active sensor is set to a first set of parameter values when activated in the first mode of operation for detecting a basic event in the ROI. The default first mode of operation of the sensor is light weight with less computational complexity for real time processing and power saving. In an example 1, an IoT application for indoor tracking and monitoring of elderly care using radars is considered. Here, multiple radars (sensors) are installed inside a room (ROI) and are connected with the edge framework (system 102) by different type of physical connections. In the initial level all the radars (sensors) are set or activated in energy saving mode or standby mode and then, Thereafter, using the pub/sub protocol a control word is sent by the system 102 to all the sensors/radars, which turn the radar in active mode.

At step 306 of the method 300, the one or more hardware processors 104 are configured to receive sensor data from the initial set of sensors and at step 308 preprocess the sensor data. This preprocessing comprises a) applying time stamps on the sensor data received from each of the initial set of sensors for time synchronizing the sensor data; and b) reducing dimensions of the time stamped sensor data using dimension reduction technique to obtain a reduced dimension sensor data.

At step 310, the one or more hardware processors 104 are configured to fuse the reduced dimension sensor data associated with each of the initial set of sensors in accordance with a chronological order of the time stamps to generate a plurality of fused datasets from the reduced dimension sensor data. Each fused dataset from the plurality of fused datasets represents a virtual sensor comprising combination of sensor data from each of the initial set of sensors, wherein the data associated with the virtual sensor has matching time stamps, which means all data with same timestamp represents virtual sensor data at given time instant t.

At step 312, the one or more hardware processors 104 are configured to detect the basic event by processing the plurality of fused datasets. The processing comprises steps of:
  a. analyzing a first fused dataset, from the plurality of fused datasets, captured during a first time window to detect an event associated with the IoT application based on a first predefined criteria, wherein the event is one of the basic event and the main event of interest; and if detection of the event is inconclusive from analysis of the first fused dataset,
  b. repeating the analysis for a set of second fused datasets, succeeding the first fused dataset, over successive time windows;
  c. storing an output of the analysis, corresponding to each of the successive time window, in a queue; and
  d. analyzing the queue based on a second predefined criteria to detect the occurrence of the event.

The analysis performed by the system 102 on the sensor data stored in the queue to derive inference and confirm an activity of interest is explained below with an example. Say, when a person (subject) is walking or doing any form of gesture activity in front of the radar (sensor), the electromagnetic wave is reflected from the entire body. Due to the Doppler effect, the received radar signal does not only contain the transmitted frequency, but also frequency shifted components. These Doppler shifts are directly proportional to the radial velocity of the moving body. Therefore, to reduce the false positive(s) a ordered queue needs to be maintained and it the human presence is detected in most of queue, the system 102 can confirm the human presence.

At step 314, the one or more hardware processors 104 are configured to activate, on detection of the basic event, the active sensors and one or more additional active sensors from the plurality of sensors to a second mode of operation to seamlessly track the basic event. The one or more parameters associated with each of the active sensors and the one or more additional sensors are set to a second set of parameter values when activated in the second mode of operation. The second set of parameter values are derived from the first set of parameter values based on a sensor error model. A sensor error model is predefined for each type of sensor. For human tracking example OW radar is low power and the computational complexity is low as compared to FMCW radar. Thus, for human tracking problem, from the CW radar data it is difficult to pinpoint the human location, it will always give the location in contour form. Thus, mode of CW radar is changed to FMCW mode. Further, from the signal amplitude level of the CW radar an error model (gauss error model) can be generated which provides the probability of human location inside the contour. This error model than can guide the FMCW radar scan area. In the example 1 herein, the second mode may refer to operating the radars in frequency modulated continuous wave (FMCW) mode, with an default excitation signal that enables radar to operate in lowest possible operating mode.

Figure 4A:
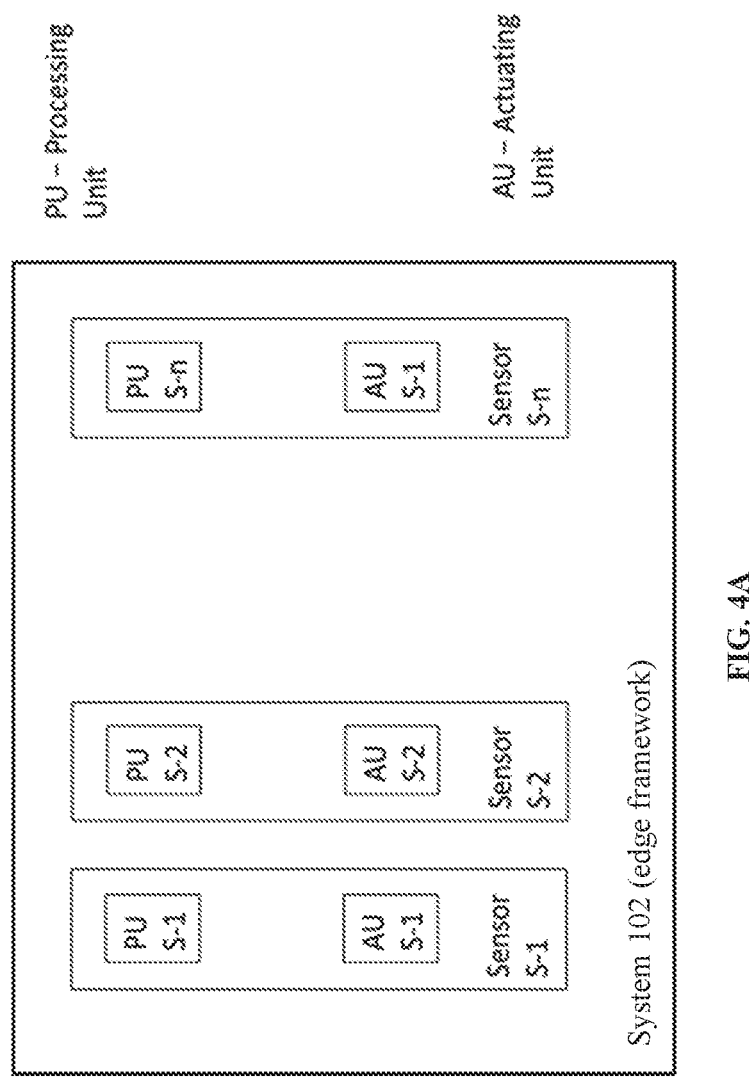
FIGS. 4A and 4B illustrate a sub-unit of the system of FIG. 1 comprising a processing unit and an actuation unit corresponding to each sensor for controlling sensors deployed in the IoT network, in accordance with some embodiments of the present disclosure.
Figure 4B:
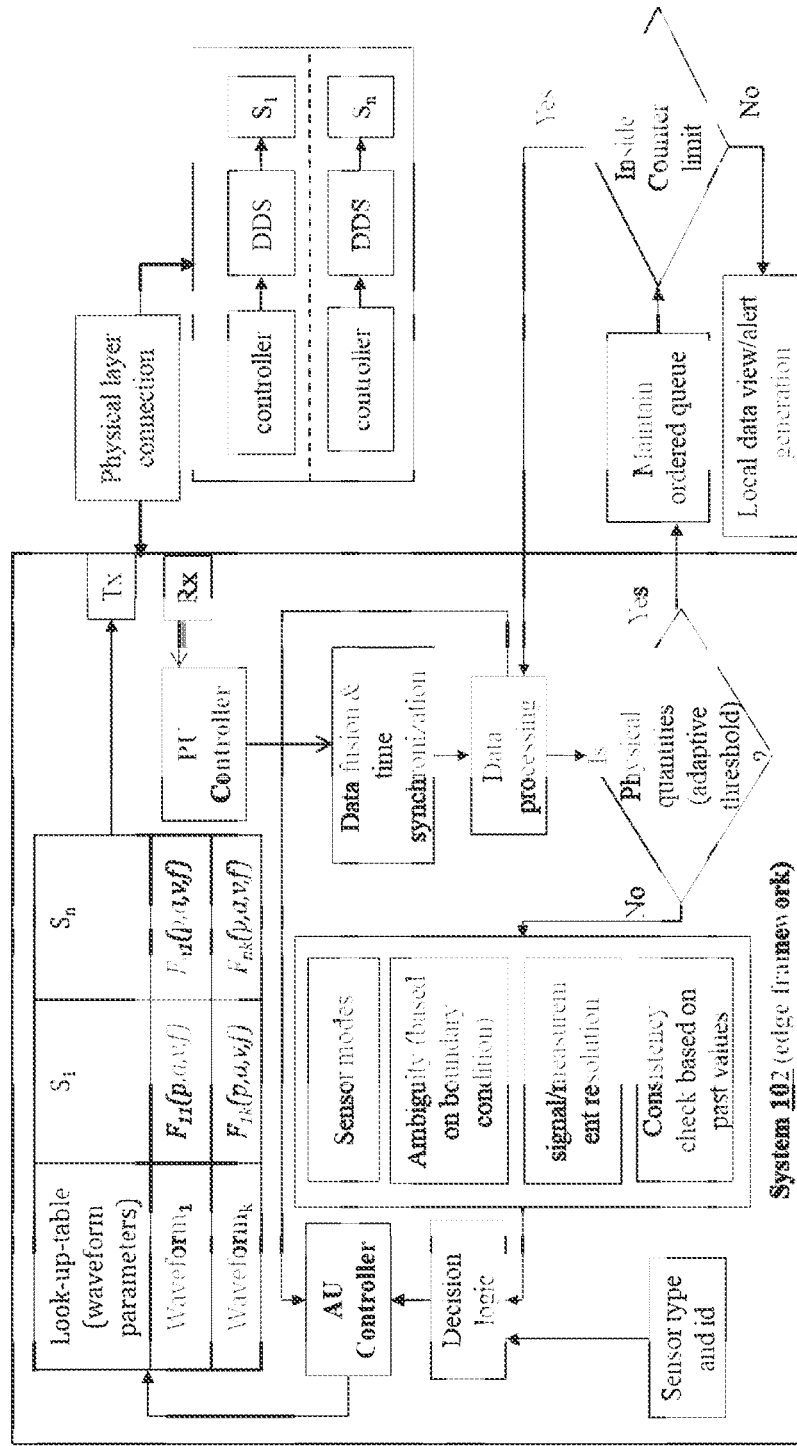

At step 316, the one or more hardware processors 104 are configured to generate and send a request code to the active sensors and the one or more additional active sensors to change an excitation signal of the active sensors and the one or more additional active sensors in accordance to a main event of interest to be monitored. The request code is generated by the subunit (processing unit (PU) and actuation unit (AU)) of the system 102 as depicted in FIGS. 4A and 4B. The request code is derived by the system 102 in accordance to the sensor error model predefined for each sensor. The sensor error model is fed from the first level to the second level and so on during the hierarchical sensor mode selection process and so on. It reduces the search space in the subsequent level. Further, the request code is decoded at each of the active sensors and the one or more additional active sensors to generate the excitation signal in accordance to the request code using the waveform control and diversity unit as explained in conjunction with FIG. 5.

At step 318, the one or more hardware processors 104 are configured to receive the sensor data at higher resolution from the active sensors and one or more additional active sensors operating in the second mode of operation.

At step 320, the one or more hardware processors 104 are configured to repeat the pre-processing, the fusing and the processing for the sensor data received from the active sensors and the one or n ore additional active sensors operating in the second mode of operation to detect and track the main event of interest. For confirming the main event queue analysis in the processing step is performed. For example, to detect and confirm the main event such as chest activity of the detected human (basic event) the presence of chest activity signal data across the queue is checked for better accuracy.

For any abnormality detected in the processed sensor data with respect to the main event, a local alert can be generated by the system 102 (edge device) informing an observer. For example, chest activity not detected can be a cause of concern and system 102 takes a decision and edge to quickly generate an alert than awaiting the decision from the cloud server 114.

All the sensor data captured in the queue is seamlessly sent to the cloud server for further deep data analysis, which demands high computational power and more resources.

The method disclosed herein, thus follows a hierarchical sensor selection mode. The first step involves initial selection and activation of sensors initial sensor for monitoring. Thus, a sensor that meets range criteria and satisfies power constraint is selected, not looking at accuracy at this stage. Sensor specification of each sensor may be stored in the database 10 and accessed by the system 102 while selecting the sensors for the particular IoT application of interest. In the example 1, the OW radar ode is chosen first. Thereafter, by analyzing the OW radar data if human presence is detected then at second step, the sensor mode that provides higher resolution at that range is selected, Since the initial scanning is performed using a lower-power sensor, the power constraint is not so important in second step since it runs for limited amount of time. To get the higher resolution the sensor mode needs to be changed which is done by sending a control word, alternatively referred as request code to the sensor. In second step the radar power is increased, beam focused and a chirp is sent for imaging, this provides tracking and activity related data and further these data are time-stamped and send to the edge for further processing. To configure these radars appropriate control words or request codes are sent from the system 102.

In the third level by changing the excitation voltage of the radar through a control word/request code the OW radar can be converted to the FMCW radar, which is now be able to detect human physiology like heart rate and breathing rate monitoring.

Hence, edge based decision making is crucial because sensors and computational illumination techniques for active sensors have to be chosen not only fast in time but also use least power and accumulate least uncertainty in the process.

FIGS. 4A and 4B illustrate the subunit of the system of FIG. 1 comprising the processing unit (PU) and the actuation unit (AU) corresponding to each sensor for controlling sensors deployed in the IoT network, in accordance with some embodiments of the present disclosure.

As depicted in FIG. 4A, the system 102 includes 1 actuating unit (AU) and one processing unit (PU) for each sensor. The AU is responsible for controlling the exciting signal wave form and the PU is responsible for processing the sensor data output. The AU corresponding to each sensor communicates the request code or control word via physical layer to the sensor end.

FIG. 4B depicts a functional block diagram of the AU and PU, in accordance with some embodiments of the present disclosure. The system 102 maintains a look up table which consist of different waveforms (sine, triangular, saw tooth, square) generating parameters like phase, amplitude, and frequency (p, a, f). Different control words are stored for different waveform in the look up table. At the beginning a control word is chosen such that the sensor works in basic mode. Once sensor data is collected it is processed (like filtering, ordered queue). On processing, if a physical quantity is detected then respective alert will be generated to the observer or system administrator. The physical quantity herein refers to an activity of interest or event of interest that is been monitored or detected. However, f still there is any form of ambiguity to conclude on the activity of interest or the presence of physical quantity, or no presence physical quantity is detected, there may be a need for increasing the resolution of received sensor data. Then the decision logic selects the appropriate new mode of operation for the sensor. Accordingly, a controller block chooses the respective control word to accomplish that mode of sensor operation. After the data processing in PU, it may be necessary to enhance the measurement resolution, nullify the ambiguity based on the boundary condition or even the sensor modes of operation needs to be changed on the fly. As mentioned, the default sensor mode of operation is light weight with less computational complexity for real time processing and power saving. The AU of the system 102 is a logical unit, which can change the sensor signal excitation as required by sensing an appropriate request code to one or more sensors.

FIG. 5 illustrates a block diagram of a sensor supported with a waveform and diversity control unit enabling changing of excitation signal of the sensor, in accordance with some embodiments of the present disclosure. Upon receiving the request code or the control word from the system 102, as depicted in figure, a controller decodes the control word and configure the DOS so that exact excitation waveform can be generated. The DOS block is followed by a buffer amplifier with unit gain. This buffer amplifier is required to isolate the EMS from the sensor, to handle any impedance mismatch. The buffer amplifier can be followed by a programmable gain amplifier (PGA) to adjust the voltage level of the signal. In parallel to the PGA, the output of the buffer amplifier is provided to a voltage control oscillator (VCO) which is also a form of excitation voltage compatible with a group of sensors. Finally, the PGA and VCO output can be multiplexed so that either through PGA or VCO the sensor can be excited.

Example 2 herein, explains the application of the system 102 to enable continuous and power efficient monitoring. The example 2 comprises of sensors such as accelerometer, gyroscope, photoplethysmogram (PPG) sensors is integrated in a smart watch used by the system 102 for monitoring activities of a subject, typically including eating, drinking, walking, being stationary. A naive approach would be to turn on all sensors at the highest sampling frequency. However, this would result in the inability to continuously monitor the patient throughout the day owing to a battery drain. Thus, the system 102, at first level turns on only the accelerometer (initial set of sensors) by turning off data generated by all other sensors, in turn conserving battery power. The accelerometer data is sent to the edge framework (system 102) and using standard machine learning models the activity of interest (AO') may be detected. The sensor data from the accelerometer enables detecting a coarse level information of different activities performed by the subject and at low power consumption as compared to other sensors. However, when accelerometer data is analyzed to identify the basic event of detecting predefined activities such eating, drinking, walking stationary and the like. Once the basic event (activity of interest) is detected, the system 102 may activate other sensors like gyroscope (or changes in sampling frequency) for the subsequent classification levels for that activity. The gyroscope sensor can be turned on (activated) through a control word (request code) generated by the system 102 and the accelerometer may be turned off. The gyroscope data so obtained will be able to fine tune the exact activity and its intensity (main event) like eating, drinking etc. Further, after certain time elapse, if the activity of interest ceases, the power consuming gyroscope can be turned off to rely only on accelerometer data till the activity of interest is detected again, and switch on the accelerometer and repeat the same process.

To classify different activity, machine learning models can be used on accelerometer data. These machine learning models have error models from which probability of being misclassified can be obtained. These error models or error bounds are fed to the second level (during gyroscope data classification) to limit or to get the contour of the search space.

Example 3 is related to machine health inspection. Health inspection means spatial and temporal decomposition method which enables a Smart-Machine to assess the true stress on parts vibrating and rotating. To access the smart machine health, required is to analyze the frequencies of different rotating parts temporally and spatially, Here all the sensor data of all radars used by the system is received by the system 102 via the pub/sub-based communication protocol. At the first level the OW radars are activated from standby mode to active mode. By analyzing the radar data obtained is the temporal information of different frequencies (f1, f2, . . . fn) at which different machine parts are vibrating. However, the initial sensor data does not provide the spatial information of these frequencies i.e. exactly from which machine part these frequencies originating. From the radar error model, it can be understood what the confidence interval could be, or error in a measurement be, which is often the standard deviation or standard error. So, the measurement f1 should be considered as f1±f'. Thus, in the second step to get the spatial information the system 102 communicates the control word to another sensor (a stroboscope), enabling switching 'ON' the stroboscope (another sensor). The stroboscope is an instrument that emits a series of brief, intense flashing lights at specific intervals. When the flashing light from a stroboscope is directed onto an object rotating at high speed appears to stand still. This enables to determine exactly the spatial location of that particular frequency. This process can continue till all the spatial information of the frequencies are calculated. Thus, the search space or error further feed to the next level of stroboscope based sensing. Once the spatial location of the frequencies is known, a camera can be activated over edge and particular portion of the machine snapshot can be taken. Thus, multiple sensors are activated in an hierarchical sequence, based on basic event that is detected and similarly the earlier activated sensor may be switched off (deactivates) once the sensor selection shifts to next level in the hierarchy.

Thus, the method and system disclosed herein enables sensor data analytics and fusion to be done at the edge rather than cloud server to solve issues with network latency and load. Due to presence of heterogeneous sensors, the sensor data is fused locally and to run data analytics, this fused data is exposed as a single virtual sensor data. Many sensors do not have provision for timestamp on the data, and between different sensors there can be time synchronization problem. To solve these issues, all sensor data is arranged according to their acquisition timestamp at the edge. Many sensors have capability of data streaming only. To cater to all sensors, the system runs all the sensor data acquisitions in parallel without stopping acquisition of sensor data. The acquired data is published, and any program can subscribe to that for getting the data. Many of the times after observing the sensor data, analysts want data from sensors by exciting it in a different way. The proposed system has the waveform control and diversity unit by which the new waveform configuration can be pushed to the sensor, and then the changed sensor data behavior can be observed either from the edge framework or from the cloud server.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for edge based sensor actuation and control in Internet of Things (IoT) network, the method comprising steps of:
    selecting, by one or more hardware processors, an initial set of sensors among a plurality of sensors deployed in the IoT network to monitor a Region of Interest (ROI) and provide sensor data for an IoT application, wherein the initial set of sensors comprise a combination of active sensors and passive sensors, and wherein the active sensors are selected in accordance with a range criteria and preset power constraint for the IoT application;
    activating, by the one or more hardware processors, the initial set of sensors, wherein one or more parameters associated with each of the active sensors are activated in a first mode of operation and each of the active sensors are set to a first set of parameter values when activated in the first mode of operation for detecting a basic event in the ROI;
    receiving, by the one or more hardware processors, sensor data from the initial set of sensors;
    preprocessing, by the one or more hardware processors, the sensor data by:
        a) applying time stamps on the sensor data received from each of the initial set of sensors for time synchronizing the sensor data; and
        b) reducing dimensions of the time stamped sensor data using dimension reduction technique to obtain a reduced dimension sensor data;
    fusing, by the one or more hardware processors, the reduced dimension sensor data associated with each of the initial set of sensors in accordance with a chronological order of the time stamps to generate a plurality of fused datasets from the reduced dimension sensor data, wherein each fused dataset from the plurality of fused datasets represents a virtual sensor comprising a combination of sensor data from each of the initial set of sensors, wherein data associated with the virtual sensor has matching time stamps;
    detecting, by the one or more hardware processors, the basic event by processing the plurality of fused datasets;
    activating, by the one or more hardware processors on detection of the basic event, the active sensors and one or more additional active sensors from the plurality of sensors to a second mode of operation to seamlessly track the basic event, wherein the one or more parameters associated with each of the active sensors and the one or more additional sensors are set to a second set of parameter values when activated in the second mode of operation;
    generating and sending, by the one or more hardware processors, a request code to the active sensors and the one or more additional active sensors to change an excitation signal of the active sensors and the one or more additional active sensors in accordance to a main event of interest to be monitored, wherein the main event is associated with the tracked basic event;
    receiving, by the one or more hardware processors, the sensor data at higher resolution from the active sensors and the one or more additional active sensors operating in the second mode of operation; and
    repeating, by the one or more hardware processors, the steps of pre-processing, fusing and processing the sensor data, received from the active sensors and the one or more additional active sensors operating in the second mode of operation, to detect and track the main event of interest.

2. The method of claim 1, wherein the step of processing the plurality of fused datasets comprises:
    analyzing a first fused dataset, from the plurality of fused datasets, captured during a first time window to detect an event associated with the IoT application based on a first predefined criteria, wherein the event is one of the basic event and the main event of interest; and
    if detection of the event is inconclusive from the analysis of the first fused dataset,
        repeating the analysis for a set of second fused datasets, succeeding the first fused dataset, over successive time windows;
        storing an output of the analysis, corresponding to each of the successive time window, in a queue; and
        analyzing the queue based on a second predefined criteria to detect an occurrence of the event.

3. The method of claim 1, wherein the second set of parameter values are derived from the first set of parameter values based on a sensor error model.

4. The method of claim 1, wherein the request code for changing excitation signal is generated by a subunit comprising a processing unit and an actuation unit for each sensor, and wherein the request code is decoded at each of the active sensors and the one or more additional active sensors by a waveform control and diversity unit to generate the excitation signal in accordance to the request code.

5. A system for edge based sensor actuation and control in Internet of Things (IoT) network, the system comprising:
   a memory storing instructions;
   one or more Input/Output (I/O) interfaces; and
   one or more hardware processors coupled to the memory via the one or more I/O interfaces, wherein the one or more hardware processors are configured by the instructions to:
      select an initial set of sensors among a plurality of sensors deployed in the IoT network to monitor a Region of Interest (ROI) and provide sensor data for an IoT application, wherein the initial set of sensors comprise a combination of active sensors and passive sensors, and wherein the active sensors are selected in accordance with a range criteria and preset power constraint for the IoT application;
      activate the initial set of sensors, wherein one or more parameters associated with each of the active sensors are activated in a first mode of operation and each of the active sensors are set to a first set of parameter values when activated in the first mode of operation for detecting a basic event in the ROI;
      receive sensor data from the initial set of sensors;
      preprocess the sensor data by:
         a) applying time stamps on the sensor data received from each of the initial set of sensors for time synchronizing the sensor data; and
         b) reducing dimensions of the time stamped sensor data using dimension reduction technique to obtain a reduced dimension sensor data;
      fuse the reduced dimension sensor data associated with each of the initial set of sensors in accordance with a chronological order of the time stamps to generate a plurality of fused datasets from the reduced dimension sensor data, wherein each fused dataset from the plurality of fused datasets represents a virtual sensor comprising combination of sensor data from each of the initial set of sensors, wherein data associated with the virtual sensor has matching time stamps;
      detect the basic event by processing the plurality of fused datasets;
      activate, on detection of the basic event, the active sensors and one or more additional active sensors from the plurality of sensors to a second mode of operation to seamlessly track the basic event, wherein the one or more parameters associated with each of the active sensors and the one or more additional sensors are set to a second set of parameter values when activated in the second mode of operation;
      generate and send a request code to the active sensors and the one or more additional active sensors to change an excitation signal of the active sensors and the one or n ore additional active sensors in accordance to a main event of interest to be monitored, wherein the main event is associated with the tracked basic event;
      receive the sensor data at higher resolution from the active sensors and the one or more additional active sensors operating in the second mode of operation; and
      repeat the steps of pre-processing, fusing and processing the sensor data received from the active sensors and the one or more additional active sensors operating in the second mode of operation to detect and track the main event of interest.

6. The system of claim 5, wherein the one or more hardware processors (104) are configured to processing the plurality of fused datasets by:
   analyzing a first fused dataset, from the plurality of fused datasets, captured during a first time window to detect an event associated with the IoT application based on a first predefined criteria, wherein the event is one of the basic event and the main event of interest; and
   if detection of the event is inconclusive from the analysis of the first fused dataset,
      repeating the analysis for a set of second fused datasets, succeeding the first fused dataset, over successive time windows;
      storing an output of the analysis, corresponding to each of the successive time window, in a queue; and
      analyzing the queue based on a second predefined criteria to detect an occurrence of the event.

7. The system of claim 5, wherein the second set of parameter values are derived from the first set of parameter values based on a sensor error model.

8. The system of claim 5, wherein the request code for changing excitation signal is generated by a subunit comprising a processing unit and an actuation unit for each sensor, and wherein the request code is decoded at each of the active sensors and the one or more additional active sensors by a waveform control and diversity unit to generate the excitation signal in accordance to the request code.

9. One or more non-transitory machine readable information storage mediums comprising one or more instructions, which when executed by one or more hardware processors causes:
   selecting an initial set of sensors among a plurality of sensors deployed in the IoT network to monitor a Region of Interest (ROI) and provide sensor data for an IoT application, wherein the initial set of sensors comprise a combination of active sensors and passive sensors, and wherein the active sensors are selected in accordance with a range criteria and preset power constraint for the IoT application,
   activating the initial set of sensors, wherein one or more parameters associated with each of the active sensors are activated in a first mode of operation and each of the active sensors are set to a first set of parameter values when activated in the first mode of operation for detecting a basic event in the ROI;
   receiving sensor data from the initial set of sensors,
   preprocessing the sensor data by:
      a) applying time stamps on the sensor data received from each of the initial set of sensors for time synchronizing the sensor data; and
      b) reducing dimensions of the time stamped sensor data using dimension reduction technique to obtain a reduced dimension sensor data;
   fusing the reduced dimension sensor data associated with each of the initial set of sensors in accordance with a chronological order of the time stamps to generate a plurality of fused datasets from the reduced dimension sensor data, wherein each fused dataset from the plurality of fused datasets represents a virtual sensor comprising a combination of sensor data from each of the initial set of sensors, wherein data associated with the virtual sensor has matching time stamps;

detecting the basic event by processing the plurality of fused datasets;

activating on detection of the basic event, the active sensors and one or more additional active sensors from the plurality of sensors to a second mode of operation to seamlessly track the basic event, wherein the one or more parameters associated with each of the active sensors and the one or more additional sensors are set to a second set of parameter values when activated in the second mode of operation;

generating and sending a request code to the active sensors and the one or more additional active sensors to change an excitation signal of the active sensors and the one or more additional active sensors in accordance to a main event of interest to be monitored, wherein the main event is associated with the tracked basic event;

receiving the sensor data at higher resolution from the active sensors and the one or more additional active sensors operating in the second mode of operation; and repeating the steps of pre-processing, fusing and processing the sensor data, received from the active sensors and the one or more additional active sensors operating in the second mode of operation, to detect and track the main event of interest.

* * * * *